United States Patent
Holtsberg (10) Patent No.: US 7,349,576 B2
(45) Date of Patent: Mar. 25, 2008

(54) METHOD, DEVICE AND COMPUTER PROGRAM FOR RECOGNITION OF A HANDWRITTEN CHARACTER

(75) Inventor: Anders Holtsberg, Lund (SE)

(73) Assignee: Zi Decuma AB, Lund (SE)

( * ) Notice: Subject to any disclaimer, the term of this patent is extended or adjusted under 35 U.S.C. 154(b) by 728 days.

(21) Appl. No.: 10/466,087

(22) PCT Filed: Jan. 11, 2002

(86) PCT No.: PCT/SE02/00037

§ 371 (c)(1),
(2), (4) Date: Dec. 10, 2003

(87) PCT Pub. No.: WO02/056242

PCT Pub. Date: Jul. 18, 2002

(65) Prior Publication Data

US 2004/0096105 A1 May 20, 2004

(30) Foreign Application Priority Data

Jan. 15, 2001 (SE) .................................... 0100114

(51) Int. Cl.
*G06K 9/00* (2006.01)
(52) U.S. Cl. ...................... 382/187; 382/200; 382/218; 382/310; 704/238; 704/239
(58) Field of Classification Search ............... 382/187, 382/186, 185, 229, 197, 214, 179, 189, 310, 382/227, 192, 204, 218, 198, 201, 209, 200, 382/203, 242, 224, 159, 228, 190, 298, 202; 704/251, 256, 256.1, 237–244
See application file for complete search history.

(56) References Cited

U.S. PATENT DOCUMENTS

| | | | |
|---|---|---|---|
| 4,284,975 A | 8/1981 | Odaka | |
| 4,653,107 A | 3/1987 | Shojima et al. | |

(Continued)

FOREIGN PATENT DOCUMENTS

| | | |
|---|---|---|
| EP | 0 555 023 A2 | 8/1993 |
| JP | 60237580 A | 11/1985 |

(Continued)

OTHER PUBLICATIONS

Translation of Notification of Reason for Rejection of Jun. 22, 2007, in Japanese Patent Application No. 2002-556828.

*Primary Examiner*—Sheela Chawan
(74) *Attorney, Agent, or Firm*—Finnegan, Henderson, Farabow, Garrett & Dunner, LLP (57) ABSTRACT

A method for recognition of a handwritten character comprises the steps of determining a plurality of position features defining the handwritten character, and comparing the handwritten character to reference characters stored in a database in order to find the closest matching reference character. The step of comparing comprises the steps of computing a difference between one of the plurality of position features of the handwritten character and a corresponding position feature of one of the reference characters, determining, by lookup in a predefined table, a distance measure based on the computed difference and determining a distance measure for each of the plurality of position features of the handwritten character, and computing a cost function based on the determined distance measures. A device and a computer program for implementing the method are also described.

22 Claims, 7 Drawing Sheets

U.S. PATENT DOCUMENTS

| | | |
|---|---|---|
| 5,659,633 A | 8/1997 | Ilan et al. |
| 5,730,468 A * | 3/1998 | Wirtz .......................... 283/70 |
| 5,774,586 A * | 6/1998 | LeCun ....................... 382/215 |
| 5,802,200 A * | 9/1998 | Wirtz ......................... 382/119 |
| 6,052,481 A | 4/2000 | Grajski et al. |

FOREIGN PATENT DOCUMENTS

| | | |
|---|---|---|
| JP | 61182185 A | 8/1986 |
| JP | 03282896 A | 12/1991 |
| JP | 08129609 A | 5/1996 |

* cited by examiner

METHOD, DEVICE AND COMPUTER PROGRAM FOR RECOGNITION OF A HANDWRITTEN CHARACTER

TECHNICAL FIELD

The present invention relates to a method for recognition of a handwritten character.

BACKGROUND OF THE INVENTION

There is an increasing need for recognition of handwriting. Portable data handling devices, such as PDAs (Personal Digital Assistant), mobile phones or portable computers, are becoming increasingly popular. In order to enter data into these portable devices, a text insertion unit is needed.

Text insertion units have formerly been implemented as keyboards. This, however, sets limits to the minimum size of the portable device, and therefore a different way of inserting text into the device is needed in order to enable smaller devices.

The keyboards are now being replaced by some kind of recognition of handwritten text. A common solution is to arrange a pressure-sensitive area where a user can write characters. The characters are then interpreted and handled by the portable device. It is, of course, also of interest to replace keyboards of regular stationary computers.

Thus, recognition of handwritten characters is an important task in portable devices. The recognition is commonly performed by comparing the handwritten character with reference characters that are stored in a database in the portable device. One such method is disclosed in U.S. Pat. No. 4,284,975.

The recognition should be fast in order to avoid annoying delays for the user. This requirement is especially hard to live up to for logographic writing systems, such as the Chinese. The Chinese writing system consists of up to 20,000 characters. Since the handwritten character has to be compared with a very large number of reference characters when recognition of a Chinese character is performed, the recognition becomes slow.

According to U.S. Pat. No. 4,284,975, differences in coordinates between points on the handwritten character and points on the reference character are calculated. These differences are used to calculate a distance measure between the points.

Today, the differences are computed in at least two steps. Two characteristics defining a point could be stored in different areas for easy access to the value of a characteristic by referring to the register where it is stored. A computation of a difference between two points is then performed in two subtractions in order to compare the two characteristics of the point. In these subtractions the registers holding the values of the characteristics could be referred to directly. However, this means that a lot of memory is needed, as the two characteristics are stored separately. Another method is to compress the values of the two characteristics for storage of each point separately. This means that less memory is required but the characteristics of the point have to be decompressed before the computation of the differences in characteristics is performed. This gives a slower method.

SUMMARY OF THE INVENTION

It is an object of the invention to provide a faster method for recognizing handwritten characters.

The object of the invention is achieved by a method for recognition of a handwritten character. The method comprises the steps of determining a plurality of position features defining the handwritten character, and comparing the handwritten character to reference characters stored in a database in order to find the closest matching reference character. The step of comparing comprises the steps of computing a difference between one of the plurality of position features of the handwritten character and a position feature of one of the reference characters, and determining, by lookup in a predefined table, a distance measure based on the computed difference. The step of comparing further comprises the steps of repeating the steps of computing a difference and determining a distance measure for each of the plurality of position features of the handwritten character, and computing a cost function based on the determined distance measures.

The inventive method is based on the understanding that a fast method for recognition of a handwritten character requires that the comparing that is to be performed between the handwritten character and a vast amount of reference characters is fast. Thus, if the step of comparing is speeded up, the entire recognition method becomes much faster. The step of comparing characters comprises the step of comparing several position features of the characters. According to the invention, the comparison of the position features is performed very fast. The step of comparing a position feature of the handwritten character to a position feature of a reference character includes a table lookup to determine a distance measure between the position features. This table lookup is faster than an actual calculation of a distance measure. Thus, each comparison of the handwritten character to a reference character becomes much faster and a small increase in the speed of comparing position features results in a considerably faster method of recognizing a handwritten character.

In other words, since discrete distances between feature points are measured, only a small number of different distance measures may be obtained. The invention is based on an insight that this could be used for faster recognition. Thus, these different distance measures according to the invention are stored in a table for fast access to a distance measure based on the computed difference. Then, the distance measures need not be determined by calculation, but in stead a table lookup will give the distance measure, whereby the determining of the distance measure is speeded up.

Possible values of the position features may be known before the start of the recognition, since the way the position features are determined during the recognition is known. Thus, the possible distance measures between the position features may also be known, whereby the table could be calculated and stored before the recognition is started.

The position features define the handwritten character. Preferably, the position features are points and/or vectors in the handwritten character. The vectors could, for example, describe a straight line between two points on the character or a derivative in a point of the character. The handwritten character could, of course, also be defined by any combination of points and vectors.

The distance measure is a function of the difference between a position feature of the handwritten character and a position feature of the reference character. This function does not have to be very complex; the distance measure is anyhow determined faster by a table lookup than by an actual calculation. In the context of this invention the term character is defined as any symbol that could be written. In some cases a character could be a part of such a symbol or a combined structure of such symbols.

Preferably, each position feature is defined by at least two characteristics. The step of computing a difference between a position feature of the handwritten character and a position feature of the reference character comprises the computing of a difference between each characteristic of the position feature of the handwritten character and corresponding characteristics of the position feature of the reference character. Two characteristics are normally-needed for defining a position feature, such as an x- and a y-coordinate for a point or an x- and a y-direction for a vector. In determining a distance measure, the differences in both characteristics for the compared position features are needed so that both characteristics contribute to the distance measure.

According to a preferred embodiment of the invention, the step of computing a difference for each characteristic is performed in a single operation. The method according to the invention computes the differences of the characteristics by storing the characteristics of each position feature in a single record and uses knowledge of which bits in the record represent each characteristic to compute the differences. Thus the position features could be stored in a small memory space and, in addition to the fast step of determining a distance measure, the step of computing the differences is very fast since only one machine code operation is needed for the computation of the difference in position features.

Preferably, the step of determining position features comprises a step of determining a location of the position features in a grid. Thereby, the position features of the handwritten character could easily be matched with corresponding position features of the reference characters.

In a preferred embodiment, the position features of the handwritten character and the reference characters comprise coordinates of comparison points. Thus, certain comparison points of the handwritten character could be compared to predefined comparison points of the reference characters in order to find a matching reference character.

Preferably, the step of determining position features comprises the step of determining an x-coordinate and a y-coordinate of the comparison point in a grid. Thereby, the position of a comparison point is easily described by two characteristics.

In a preferred embodiment, the grid is of a size of 16×16 positions and the coordinates of one comparison point are represented by one data byte. This grid size is optimal for unambiguously representing Chinese characters and for storing a position of one comparison point in a small amount of memory space.

Preferably, the distance measure received from the table lookup in the predefined table is a function of the Euclidean distance between the comparison point of the handwritten character and a comparison point of the reference character. The Euclidean distance gives an equally weighted measure of the difference in the x- and y-directions. The function could be the squared Euclidean distance, which gives an integer result if the entered differences are integer numbers.

In another embodiment, the position features of the handwritten character and the reference characters comprise positions and directions of comparison vectors. The comparison vectors could also be combined with the comparison points to define the characters. When the position features comprise comparison vectors the directions of strokes of the handwritten character are compared to corresponding comparison vectors of the reference characters defining the direction of strokes of the reference characters.

In this embodiment, the distance measure received from the table lookup in the predefined table is a function of a difference between curvatures of the handwritten character and the reference characters. This means that the derivatives of the strokes are compared.

Preferably, the method further comprises the step of centering the handwritten character in the grid before the step of determining the position features of the handwritten character is performed. As a result, a translation of the position of the handwritten character is accounted for and the position is adapted to the positioning of the reference characters. Thereby, the handwritten character could be drawn at any place, where detection of the writing is active.

Advantageously, the method further comprises the step of scaling the handwritten character to a normalized size in accordance with the size of the reference characters, before the step of determining the position features of the handwritten character is performed. Thus, the size of the handwritten character is not crucial for recognition.

In a preferred embodiment, the method further comprises the step of determining the number of strokes that forms the handwritten character. This is a way of classifying the characters to avoid comparing the handwritten character to every single reference character.

Preferably, the step of comparing the handwritten character to reference characters comprises the step of initially comparing the handwritten character to reference characters that are formed by the same number of strokes. As a result, the handwritten character initially is compared to the reference characters that are most likely to be the closest matching reference character.

In addition, the step of comparing preferably further comprises the step of comparing the handwritten character to reference characters that are formed by a few strokes fewer than the handwritten character to allow for erroneous merging of strokes. It is not unusual that two strokes are merged because the writer does not lift the pen when he is supposed to. This arrangement means that the right closest matching reference character should be found even if the writer wrongfully merges two strokes.

Moreover, the step of comparing preferably further comprises the step of comparing the handwritten character to reference characters that are formed by a few strokes more than the handwritten character to allow for erroneous lifting of a pen. This arrangement means that the reference character should be found even if the writer wrongfully lifts the pen in a stroke.

In another preferred embodiment, a stroke of the handwritten character is compared to a corresponding stroke of the reference character, wherein the corresponding strokes are determined by the order in which the strokes of the handwritten character are drawn. Thus, the corresponding position features of the reference characters are easily related to the position features of the handwritten character to which they correspond. This is especially useful for Chinese characters, since these have a special scheme for the order in which strokes should be drawn. This means that a skilled writer of Chinese characters seldom draws strokes of a character in the wrong order.

Preferably, the method further comprises the step of reorganizing the order of the strokes of the handwritten character to allow for erroneous order of drawing the strokes. This arrangement makes it possible to find a correct closest matching reference character even if the writer draws the strokes of the character in the wrong order.

In a prefer-red embodiment, the method further comprises the step of computing an affine transformation of the handwritten character to compensate for possible slant of the handwritten character, and subsequently comparing the transformed character to the reference characters of the database. This arrangement results in that the correct closest matching reference character can be found even if the writer draws a sloping character.

The object of the invention is also achieved by a device for recognition of a handwritten character and for transforming it into a digital format. The device comprises means for determining a plurality of position features defining the handwritten character, a database, comprising reference characters, and means for comparing the handwritten character to the reference characters of said database in order to find the closest matching reference character. Said means for comparing comprises means for computing a difference between one of the plurality of position features of the handwritten character and a position feature of one of the reference characters, and a predefined table, which defines a distance measure based on differences in position features. Said means for comparing further comprises means for determining a distance measure by lookup in said predefined table, and means for computing a cost function based on the determined distance measures.

Such a device could be used for input of text to a data handling device, thus replacing or complementing the keyboards. The table lookup according to the invention makes the recognition of handwritten characters very fast. Thus annoying waiting times are eliminated.

The object of the invention is also achieved by a computer program according to claim 22.

BRIEF DESCRIPTION OF THE DRAWINGS

The present invention will now be described in more detail by way of example referring to the appended drawings.

DETAILED DESCRIPTION OF A PREFERRED EMBODIMENT OF THE INVENTION

Figure 1:
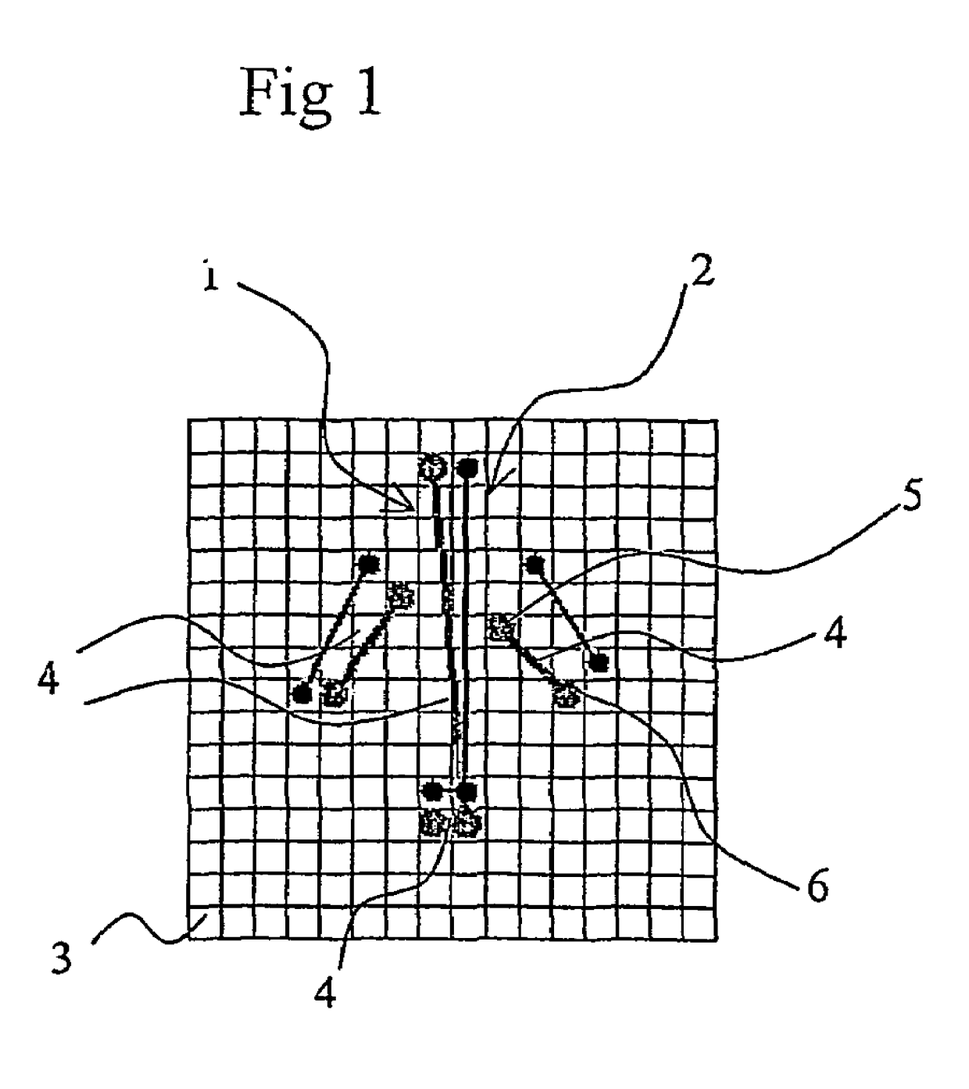
FIG. 1 shows a handwritten character and a matching reference character.

In FIG. 1 a handwritten character 1 (thick, grey lines) and a reference character 2 (thin, black lines) are shown placed in a grid 3. The handwritten character 1 consists of several strokes 4. The placements in the grid 3 of the start 5 and end points 6 of each stroke 4 is marked. The start 5 and end points 6 of the strokes 3 are preferably used as position features of the handwritten character 1. Their x- and y-coordinates in the grid 3 define the position features. Of course, another coordinate system could be used, such as a polar coordinate system. Additional position features of the handwritten character 1 could be a vector from the start point 5 to the end point 6 of each stroke 4 or additional points on the strokes 4 between the start 5 and end points 6. The handwritten character 1 is compared to the reference character 2 by comparison of the position features of the handwritten character 1 to the position features of the reference character 2, as will be described in further detail below.

Referring to FIGS. 2-6, a preferred method for recognition of a handwritten character will now be described. The following description will be made with reference to a written character on a pressure-sensitive area, whereupon immediate character recognition is performed. However, as will be pointed out later, the method could also be applied to a handwritten character on a piece of paper that is subsequently scanned into a digital format.

Figure 2:
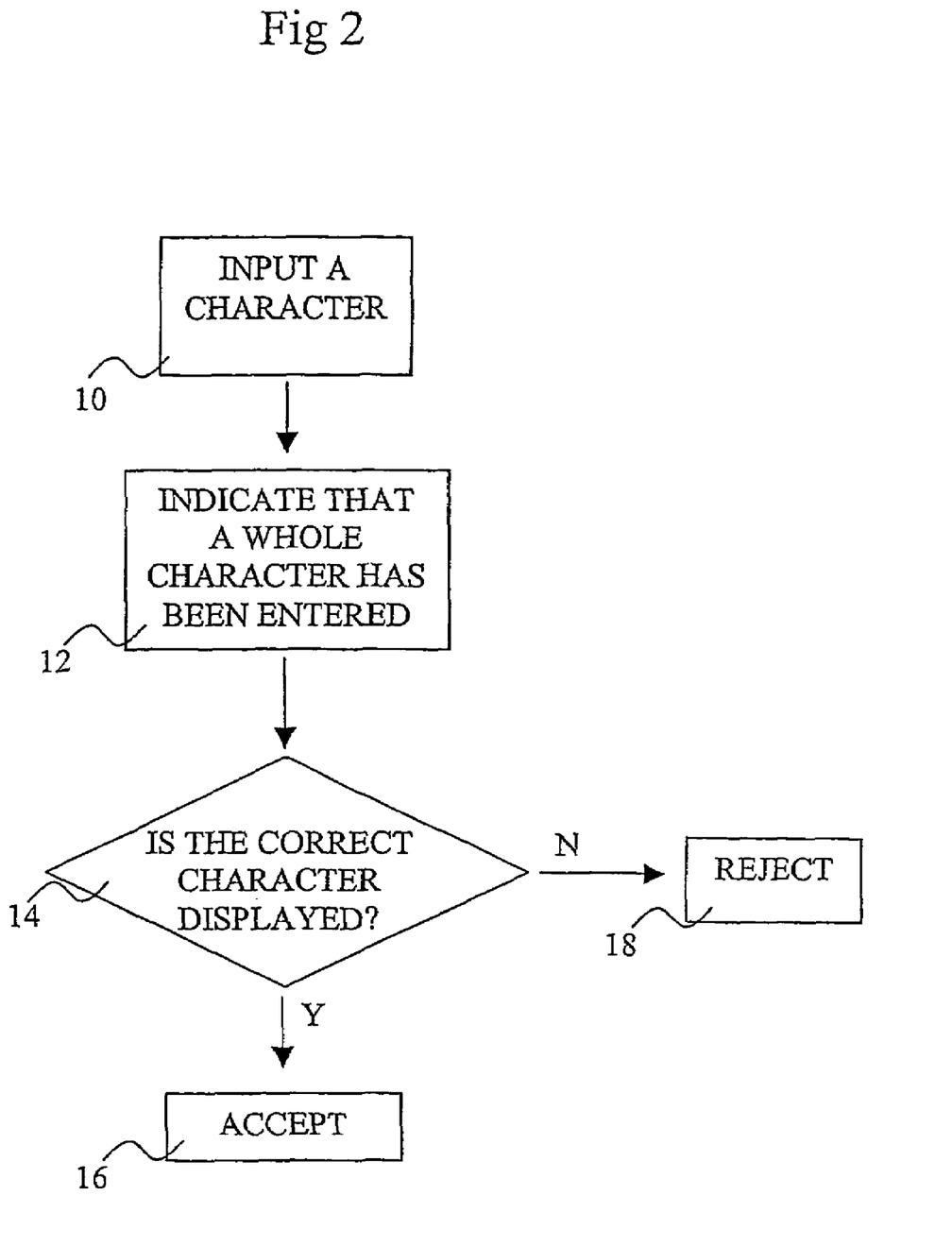
FIG. 2 is a flowchart of a user's interaction with a device implementing the method according to the invention.

Referring to FIG. 2, the action of a user for inputting characters by hand is described. A character is manually written, step 10, on a pressure-sensitive area for recognition and transformation into a digital format. The pressure-sensitive area is an input unit connected to a data handling device, such as a computer, a PDA or a mobile phone. The user writes on the pressure-sensitive area by using a pointed object, hereinafter called a pen, to apply pressure in the area. A character consists of at least one stroke, that is a line drawn without lifting the pen. The user draws the strokes that form the character. When a whole character has been entered the user indicates this, step 12, to the data handling device, which then will compare the handwritten character to reference characters in order to find the closest matching character. There are other ways for the data handling device to find out that a whole character has been entered, e.g. a time out of no action of the user could indicate this. The closest matching characters will then be displayed to the user who will answer if the correct character is displayed, step 14. The user can accept, step 16, or reject, step 18, the proposed character.

Figure 3:
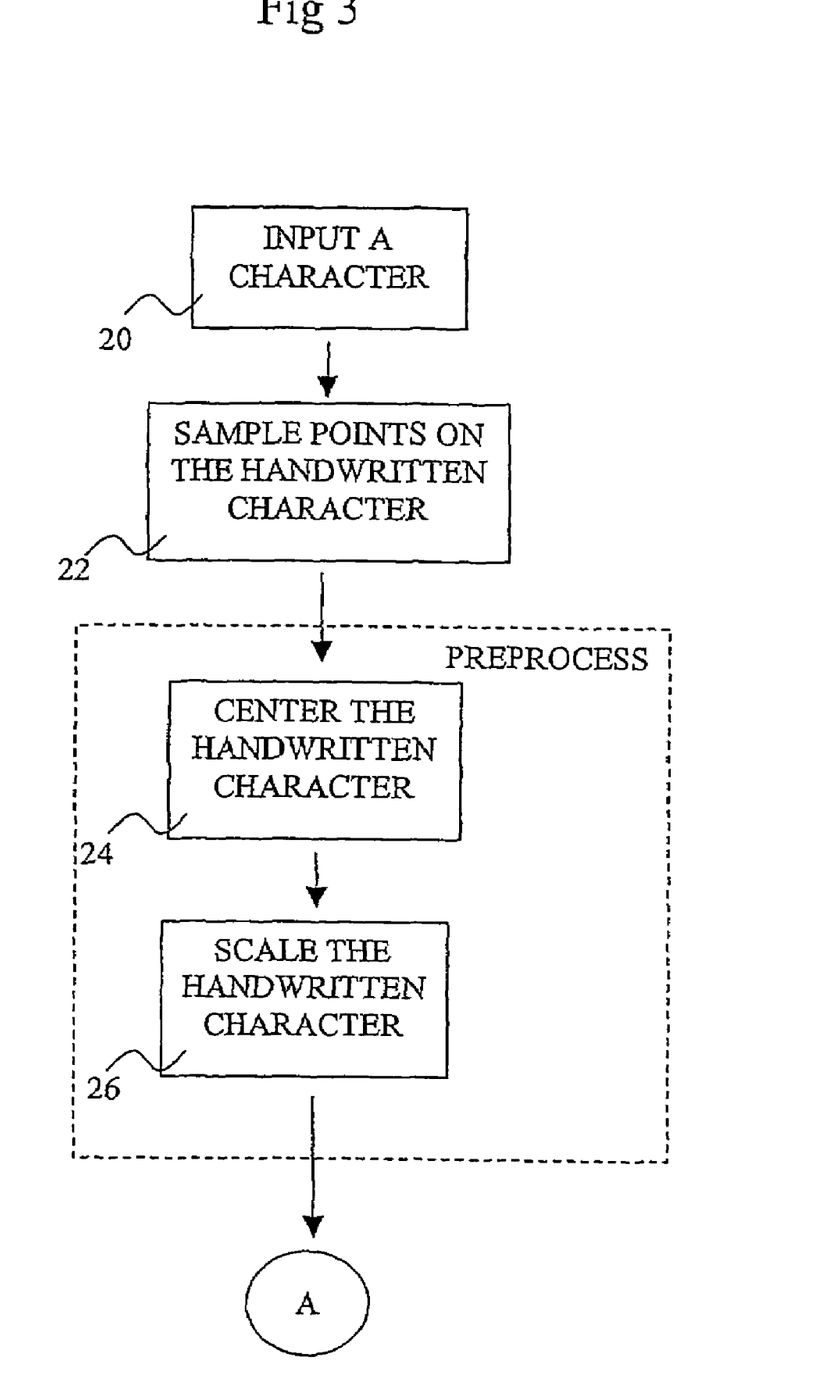
FIG. 3 is a flowchart of the preprocessing of a handwritten character before the actual recognition is performed.

Referring to FIG. 3, the data processing of the handwritten character will now be described in greater detail. When a handwritten character is entered, step 20, points on the handwritten character are sampled, step 22, in order to define the handwritten character. These points are preferably determined by their x- and y-coordinates in a grid. The points are used later for comparing the handwritten character to reference characters. After the step of sampling, step 22, the entered handwritten character is preprocessed to correct for erroneous location or size of the handwritten character.

The preprocessing comprises the step of centering, step 24, the handwritten character in the grid and the step of scaling, step 26, the handwritten character to a normalized size. These steps 24-26 are performed according to the following. First, the mean values of the x- and y-coordinates of all sampled points are determined. Then the x- and y-mean values are subtracted from the coordinates of the sampled points, thus placing the center of mass of the handwritten character at the origin. Thereupon, the standard deviation of the distance from the sampled points to the center of mass is normalized. This size corresponds to the size of the reference characters. Finally, the handwritten character is moved to the center of the grid. The sampled points are preferably determined with a higher resolution than the resolution used during the process of comparing the handwritten character to the reference characters. The scaling of the character could then include changing the resolution, which implies that the values of the x- and y-coordinates are divided by the ratio between the resolutions.

The handwritten character is constituted of strokes, that is lines drawn without lifting the pen. Each stroke is sampled and position features are determined. The sampling could detect a position feature at specific intervals and the location of the pen at that time determines the position feature. Alternatively, the start and end positions of the stroke are determined. An additional position is determined by calculating which point on the stroke that deviates most from a straight line between the start and end position. Further additional positions could be determined in the same manner. A position feature of the handwritten character could be coordinates of a sampled point. It could alternatively be a direction vector between two adjacent sampled points or a curvature vector, defining the difference in direction between two adjacent direction vectors.

The strokes are listed according to the order in which they are drawn. The first stroke of the handwritten character is then compared to the first stroke in the reference character and so on. This is especially useful for Chinese characters since the stroke order is unambiguous. However, if the strokes are drawn in the wrong order, this could be accounted for by reshuffling the order of the strokes. The reshuffling could be performed by comparing each stroke of the handwritten character to each stroke of the reference character and determining which stroke is the best match to each stroke of the handwritten character.

The handwritten character is represented by a plurality of position features. These position features could comprise coordinates of sampled points, direction vectors, curvature vectors or any combination of these. The position features of the handwritten character are compared to position features of the reference characters in order to find the closest matching reference character. The position features of the reference characters are predefined and represent the same characteristics as the position features extracted from the handwritten character. However, it is not necessary that there is a corresponding position feature for every position feature of the handwritten character. One position feature of the reference character could be used for comparison with two or more position features of the handwritten character, or vice versa. The strokes need varying numbers of position features to be well defined. Thus, three position features of the handwritten character could be compared to four position features of a reference character. In this case, it is necessary to determine which position features of the reference character correspond to the position features of the handwritten character. This implies that the three position features of the reference character that differ least from the position features of the handwritten character could be selected as corresponding position features of the reference character. Alternatively, one position feature of the handwritten character could be assigned two corresponding position features and two distance measures could be calculated for this position feature.

In a preferred embodiment, the position features comprise comparison points of the characters. The positions of the comparison points in the grid are determined by its x- and y-coordinates. The grid preferably consists of 16×16 squares and thus a comparison point could be represented by one byte of data since four bits are needed for the x- and y-coordinates, respectively.

Figure 4:
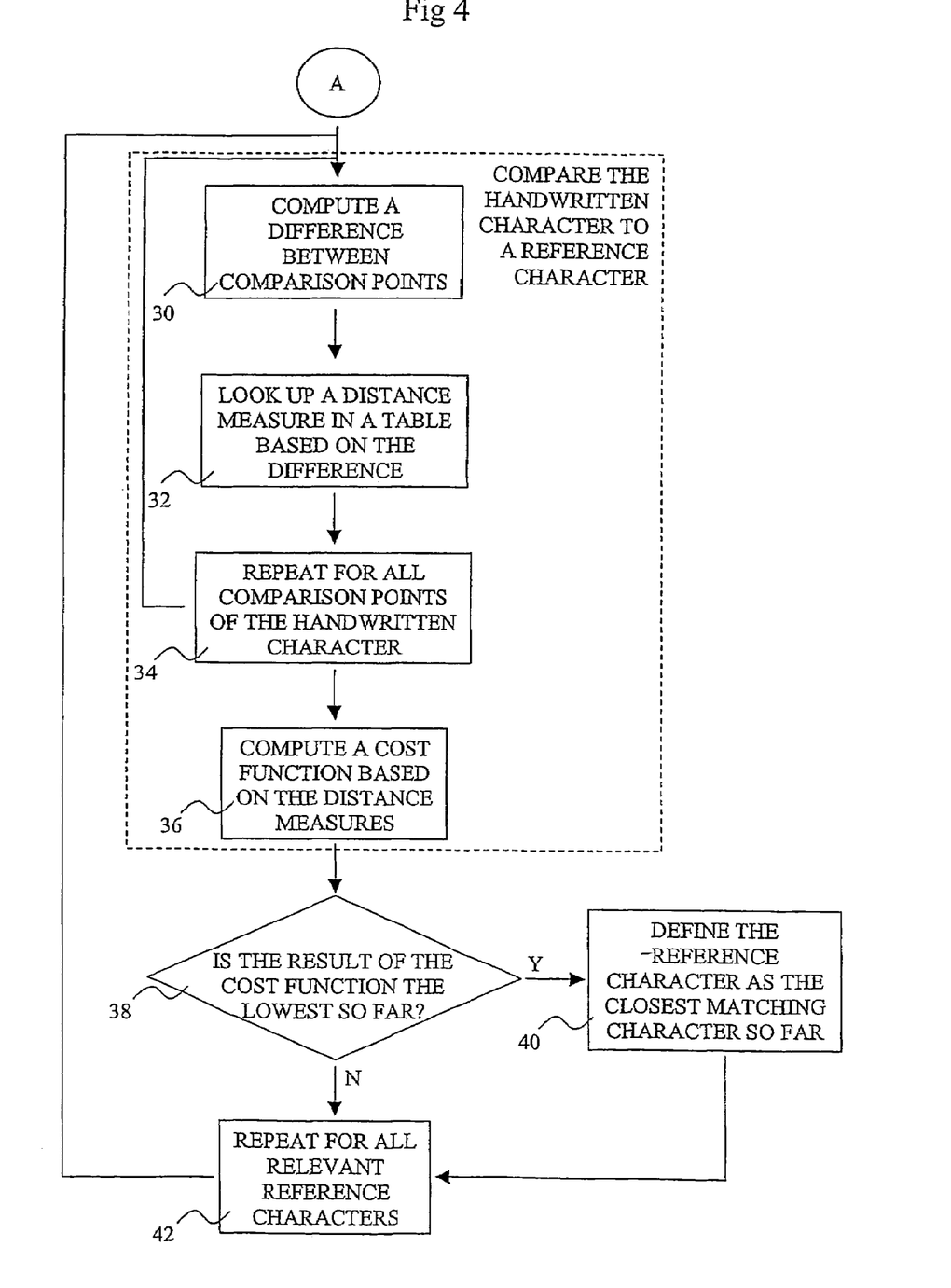
FIG. 4 is a flowchart of the process of comparing a handwritten character to a reference character.

Referring to FIG. 4, the comparing of the handwritten character to reference characters will now be described in greater detail. The reference characters are stored as information of their corresponding position features in a database in the data handling device. Each comparison point of the handwritten character is compared to a corresponding comparison point of the reference character. This is achieved by computing the difference, step 30, between the comparison points, i.e. subtracting the value of the x- and y-coordinates of the corresponding comparison point of the reference character from the value of the x- and y-coordinates of the comparison point of the handwritten character. The differences are then used as input for looking up a distance measure, step 32, in a predefined table. Any function of the form $$f(x_a-x_b)+g(y_a-y_b)$$

could be used as the distance measure, where f and g are functions and $(x_a,y_a)$ is the comparison point of the handwritten character and $(x_b,y_b)$ is the corresponding comparison point of the reference character. Instead, the features $(x_a,y_a)$ and $(x_b,y_b)$ could, naturally, represent a direction vector or a curvature vector.

In the preferred embodiment, the table defines the distance measure as the squared Euclidean distance between the points, i.e. the table gives the result of $$(x_a-x_b)^2+(y_a-y_b)^2.$$

This gives a positive value for all distances and further gives an integer result if the two differences are integer numbers.

The coordinates $(X_a,y_a)$ of a comparison point are stored in one byte of data. The x-coordinate is stored in the first nybble, that is the first four bits, and the y-coordinate is stored in the subsequent nybble. The differences $(x_a-x_b)$ and $(y_a-y_b)$ could then be computed simultaneously in one operation as the storage position of the x- and y-values are known. The differences $(x_a-x_b)$ and $(y_a-y_b)$ are represented in nine bits and used as input for the predefined table. The first nybble, that is the first four bits, represents the difference $(x_a-x_b)$ and the subsequent nybble represents the difference $(y_a-y_b)$. The ninth bit is a carry bit that indicates if the difference in y-coordinates is negative. For the x-coordinates it is assumed that a difference of more than 8 x-ticks never occurs. Therefore the first nybble is interpreted as representing the interval [−7,8]. The subtraction is performed by simply subtracting the 8 bits $(x_b,y_b)$ from $(x_a,y_a)$. If the difference in the four least significant bits, that is $(x_a-x_b)$, is negative it will affect the difference of $(y_a-y_b)$. The result in the four subsequent bits will then be $(y_a-y_b)-1$, and this is accounted for in the predefined table. Of course, an empty bit could be placed between the x- and the y-coordinates, which then would be a carry bit for negative values of $(x_a-x_b)$ However, according to the preferred embodiment, the error arising in $(y_a-y_b)$, when a difference of more than 8 x-ticks occurs, is assumed to be of no importance. If this difference of more than 8 x-ticks would happen the characters that are being compared are so different that the reference character will not be interpreted as the closest matching character. The predefined table consists of 16*32=512 elements. Alternatively, the carry bit of the y-coordinates could also be ignored. In such case the table would consist of only 256 elements.

If a 16×16 grid is used, all points are not guaranteed to be at most 8 x-ticks away from each other. However, strokes of Chinese characters are mainly drawn left to right or downwards, so there will be little risk of confusion. Alternatively, an 8×8 grid could be used, which means that only three bits would have to be used for representation of each coordinate. This would however yield a resolution that is too coarse for Chinese characters, but could be used for other applications.

The lookup in the table returns a result of a distance measure. This determination of a distance measure, step 30 and 32, is repeated, step 34, for all position features of the handwritten character. Then a cost function is computed, step 36, defining the resemblance of the reference character to the handwritten character. This cost function could be a sum of all the determined measures. The result of the cost function for the reference character is checked, step 38, to find if it is the lowest result so far of the compared reference characters. If the result is the lowest so far it is stored and the reference character is defined, step 40, as the closest matching reference character so far.

If the sum of the determined distance measures of a reference character exceeds the sum of the closest matching reference character so far before all distance measures have been determined for the reference character, the comparing could be interrupted. In that case, the reference character is rejected before all distance measures have been determined, because the sum of the distance measures is already too high.

The steps 30-38 of comparing are repeated for all reference characters. The reference character stored as the closest matching reference character so far when the handwritten character has been compared to all reference characters is deemed to be the closest matching reference character. The closest matching reference characters could then be displayed and the user could thus check if the handwritten character has been correctly recognized, as described above in FIG. 2.

Figure 5:
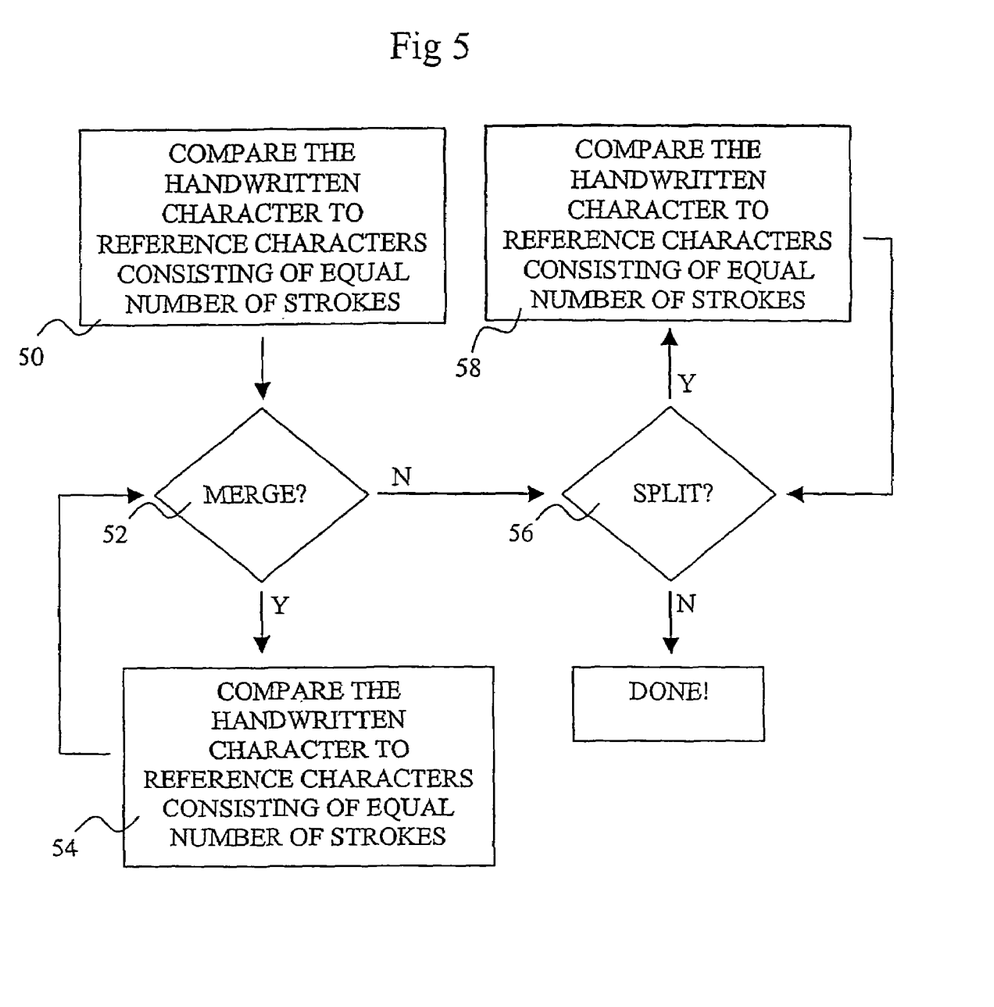
FIG. 5 is a flowchart describing the order in which the handwritten character is compared to the reference characters.

Referring to FIG. 5, a way of intelligently selecting the reference characters that are most likely to be the correct character is described. The reference characters in the database are divided into groups based on the number of strokes of which they consist. The handwritten character is then compared to reference characters consisting of the same number of strokes, step 50, thus initially defining a small part of the reference characters as the most likely to be the closest matching character.

However, when a user draws a handwritten character, two strokes could be merged together erroneously or a single stroke could be divided into two if the user lifts the pen in the middle of the stroke. This means that the handwritten character should be compared to reference characters with a slightly different number of strokes. The positioning of the strokes in the handwritten character is investigated. Pairs of strokes where one stroke has its end close to the beginning of the other stroke are merged, step 52, before the handwritten character is compared, step 54, to reference characters with a number of strokes corresponding to the new number of strokes in the handwritten character. Combinations of differently merged strokes are compared to reference characters with corresponding number of strokes.

Further, a stroke could be divided, step 56, by setting a breakpoint and defining the two parts of the stroke on each side of the breakpoint as two individual strokes. Then the handwritten character is compared, step 58, to reference characters with a number of strokes corresponding to the new number of strokes in the handwritten character. The merging and dividing of strokes could be repeated several times and in different combinations in order to find a properly drawn character.

Thus, a great part of the reference characters are never compared to the handwritten character, since these reference characters have a number of strokes that differ too much from the number of strokes of the handwritten character.

Figure 6:
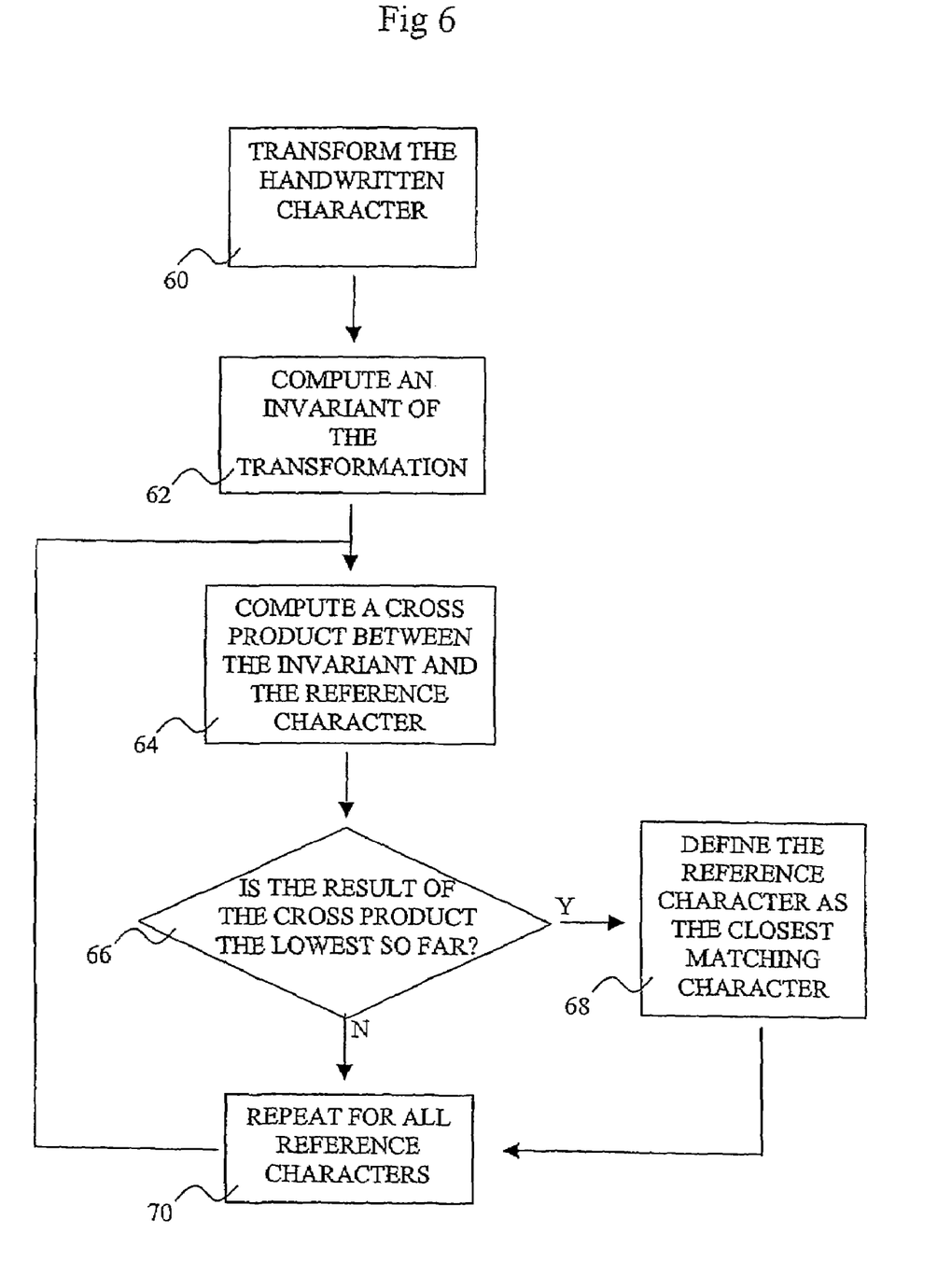
FIG. 6 is a flowchart of the process of comparing an affine transformation of the handwritten character to the reference characters.

Referring to FIG. 6, the handwritten character could also have an erroneous slant. The proper matching reference character could then be found by making an affine transformation, step 60, of the handwritten character. An invariant of the affine transformation could be computed, step 62, for the handwritten character. This invariant is used for comparing the handwritten character to the reference characters. The cross product is computed, step 64, between the invariant and the reference character. If the characters are identical they span the same space and therefore the internal cross product will be zero. The cross product between the invariant and the reference character is determined by table lookup.

As can be seen from the above, a great number of comparisons have to be made. The handwritten character should be compared to many different reference characters. Furthermore, the handwritten character could have been drawn in a slightly erroneous manner. In order to compensate for this, some transformations (merging of strokes, dividing of strokes, affine transformations) need to be made of the handwritten character and the new characters obtained from these transformations have to be compared to the reference characters. It is therefore a great advantage if the comparison between characters is fast. This is accomplished by the table lookup for the determining of distance measures according to the invention.

Above, the description has been made essentially on the basis of the characters being written on a display and being detected at the same time as they are written. An alternative is that the characters are detected, for instance scanned, after they have been written on a piece of paper. This concerns handwritten characters as well as typewritten ones. Thus, the detection comprises, instead of the operation of recognizing the display writing, the operation of reading (scanning) the characters from the piece of paper. Position features of the read characters are thus detected and recognition could be performed as described above.

Figure 7:
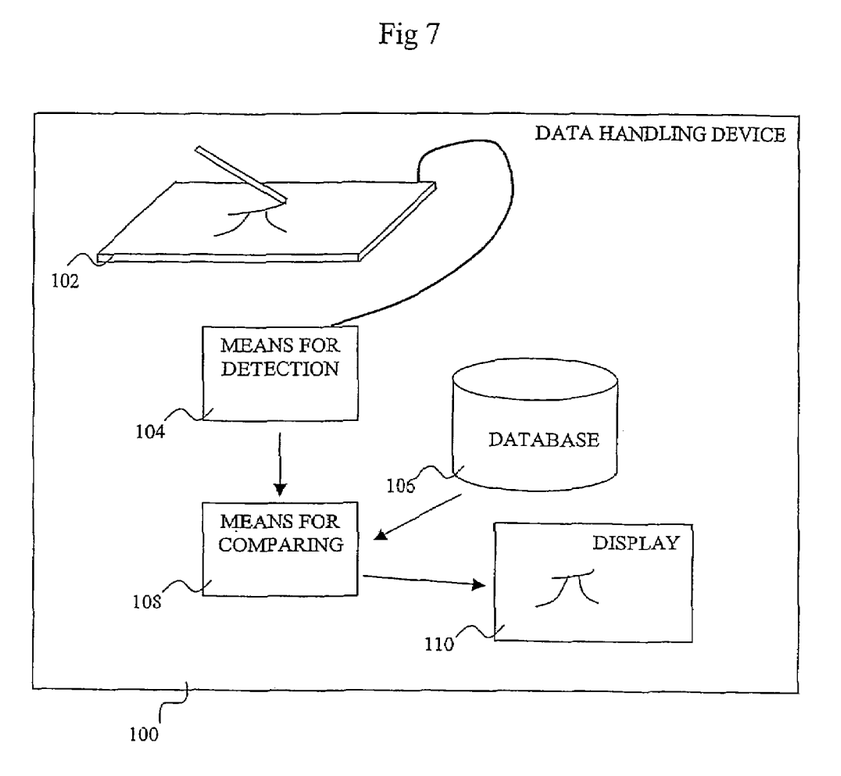
FIG. 7 shows a device implementing the method according to the invention.

Referring to FIG. 7, a device according to the invention will be described. A data handling device 100, such as a computer, a PDA, a mobile phone, a scanner or the like, comprises a text input unit 102 for entering text by manual writing. The data handling device 100 includes a means for detecting 104 the entered text. The means for detection 104 determines position features of a handwritten character.

The data handling device 100 includes a database 106, or at least access to one. The database comprises reference characters and representations of their appearance. The data handling device 100 further includes means for comparing 108 the detected handwritten character to the reference characters in the database according to the method described above.

The means for comparing 108 could start to compare the handwritten character simultaneously with the inputting/writing of the character. Alternatively, the comparison could be initiated by an indication from the user that the whole character has been entered.

The means for comparing 108 returns a reference character that is the closest match to the handwritten character. The data handling device 100 displays this closest matching character on a display 110 and is now prepared to recognize a new character.

When the closest matching character is displayed the user could be asked to check if the handwritten character has been correctly recognized. If the user rejects the closest matching character, the data handling device 100 could display the second best match. Alternatively, the user could be asked to enter the character once more.

The data handling device 100 could as another alternative recognize the characters without asking the user for an accept/rejection. An entered text could then be checked for correct spelling and grammar, and errors could be displayed to the user. The user could then proof-read the text and correct the misinterpreted characters.

It should be emphasized that the preferred embodiment described herein is in no way limiting and that many alternative embodiments are possible within the scope of protection defined by the appended claims. For example, the grid could be of other sizes, e.g. 8×8 or 32×32, or even of asymmetrical size, such as 16×8. It is, however, appropriate that the grid size is a power of two, as the x- and y-coordinates are represented in binary numbers. Accordingly, for example three or five bits could be used to represent a coordinate.

The invention claimed is:

1. A method for recognition of a handwritten character, which method comprises the steps of:
   determining a plurality of position features defining the handwritten character, and
   comparing the handwritten character to reference characters stored in a database in order to find the closest matching reference character, said step of comparing comprising the steps of:
      computing a difference between one of the plurality of position features of the handwritten character and a position feature of one of the reference characters,
      determining, by lookup in a predefined table, a distance measure based on the computed difference,
      repeating the steps of computing a difference and determining a distance measure for each of the plurality of position features of the handwritten character, and
      computing a cost function based on the determined distance measures.

2. The method according to claim 1, wherein each position feature is defined by at least two characteristics and wherein the step of computing a difference between a position feature of the handwritten character and a position feature of the reference character comprises the computing of a difference between each characteristic of the position feature of the handwritten character and the corresponding characteristics of the position feature of the reference character.

3. The method according to claim 2, wherein the step of computing a difference for each characteristic is performed in a single operation.

4. The method according to any one of the preceding claims, wherein the step of determining position features comprises the step of determining a location of the position features in a grid.

5. The method according to claim 4, further comprising the step of centering the handwritten character in the grid before the step of determining the position features of the handwritten character is performed.

6. The method according to any one of claims 1 to 3, wherein the position features of the handwritten character and the reference characters comprise coordinates of comparison points.

7. The method according to claim 6, wherein the step of determining position features comprises the step of determining an x-coordinate and a y-coordinate of the comparison point in a grid.

8. The method according to claim 7, wherein the grid is of a size of 16×16 positions and the coordinates of one comparison point are represented by one data byte.

9. The method according to claim 6, wherein the distance measure received from the table lookup in the predefined table is a function of the Euclidean distance between the comparison point of the handwritten character and a comparison point of the reference character.

10. The method according to any one of claims 1 to 3, wherein the position features of the handwritten character and the reference characters comprise positions and directions of comparison vectors.

11. The method according to claim 10, wherein the distance measure received from the table lookup in the predefined table is a function of a difference between curvatures of the handwritten character and the reference characters.

12. The method according to any one of claims 1 to 3, further comprising the step of scaling the handwritten character to a normalized size in accordance with the size of the reference characters, before the step of determining the position features of the handwritten character is performed.

13. The method according to any one of claims 1 to 3, further comprising the step of determining the number of strokes that forms the handwritten character.

14. The method according to claim 13, wherein the step of comparing the handwritten character to reference characters comprises the step of initially comparing the handwritten character to reference characters that are formed by the same number of strokes.

15. The method according to claim 13, wherein the step of comparing further comprises the step of comparing the handwritten character to reference characters that are formed by a few strokes fewer than the handwritten character.

16. The method according to claim 13 wherein the step of comparing further comprises the step of comparing the handwritten character to reference characters that are formed by a few strokes more than the handwritten character.

17. The method according to claim 13, wherein a stroke of the handwritten character is compared to a corresponding stroke of the reference character, wherein the corresponding strokes are determined by the order in which the strokes of the handwritten character are drawn.

18. The method according to claim 17, further comprising the step of reorganizing the order of the strokes of the handwritten character.

19. A device for recognition of a handwritten character and for transforming it into a digital format, comprising:
   means for determining a plurality of position features defining the handwritten character,
   a database, comprising reference characters,
   means for comparing the handwritten character to said reference characters of said database in order to find the closest, matching reference character, said means for comparing comprising:
      means for computing a difference between one of the plurality of position features of the handwritten character and a position feature of one of the reference characters,
      a predefined table, defining a distance measure based on differences in position features,
      means for determining a distance measure by lookup in said predefined table, and
      means for computing a cost function based on the determined distance measures.

20. The device according to claim 19, wherein a position feature comprises two characteristics defining it and said characteristics are stored in one data register in the database.

21. A handheld device for data handling comprising a pressure-sensitive area, which is arranged for manual writing of a character and a device according to claim 19 for recognizing a character written in the pressure-sensitive area for transforming it into a digital format.

22. A computer-readable medium storing instructions, which when executed by a computer, perform a method for recognition of a handwritten character, the method comprising:

determining a plurality of position features defining the handwritten character, and comparing the handwritten character to reference characters stored in a database in order to find the closest matching reference character, said code for comparing comprising:

computing a difference between one of the plurality of position features of the handwritten character and a position feature of one of the reference characters, determining, by lookup in a predefined table, a distance measure based on the computed difference, repeating the steps of computing a difference and determining a distance measure for each of the plurality of position features of the handwritten character, and computing a cost function based on the determined distance measures.

* * * * *